United States Patent [19]
Toussagnon et al.

[11] Patent Number: 6,068,029
[45] Date of Patent: May 30, 2000

[54] TEMPERATURE COMPENSATED ASSEMBLY PLANT OIL FILL

[75] Inventors: Edwige K. Toussagnon, Sterling Heights; David N. Concannon, Troy; Charles J. Redinger, Utica, all of Mich.

[73] Assignee: DaimlerChrysler Corporation, Auburn Hills, Mich.

[21] Appl. No.: 09/283,885

[22] Filed: Apr. 1, 1999

[51] Int. Cl.⁷ .................................... B65B 1/04
[52] U.S. Cl. .................. 141/1; 141/83; 141/94; 141/98; 141/192; 184/1.5

[58] Field of Search .................. 141/1, 4, 5, 7, 141/98, 192, 198, 94, 95, 82, 83; 184/1.5, 103.1, 105.1

Primary Examiner—Steven O. Douglas
Assistant Examiner—Timothy L. Maust
Attorney, Agent, or Firm—Marc Lorelli

[57] ABSTRACT

A method of filling a transmission with oil is provided. The method compensates for temperature variations of the oil initially put into the transmission prior to a final top off oil fill.

3 Claims, 4 Drawing Sheets

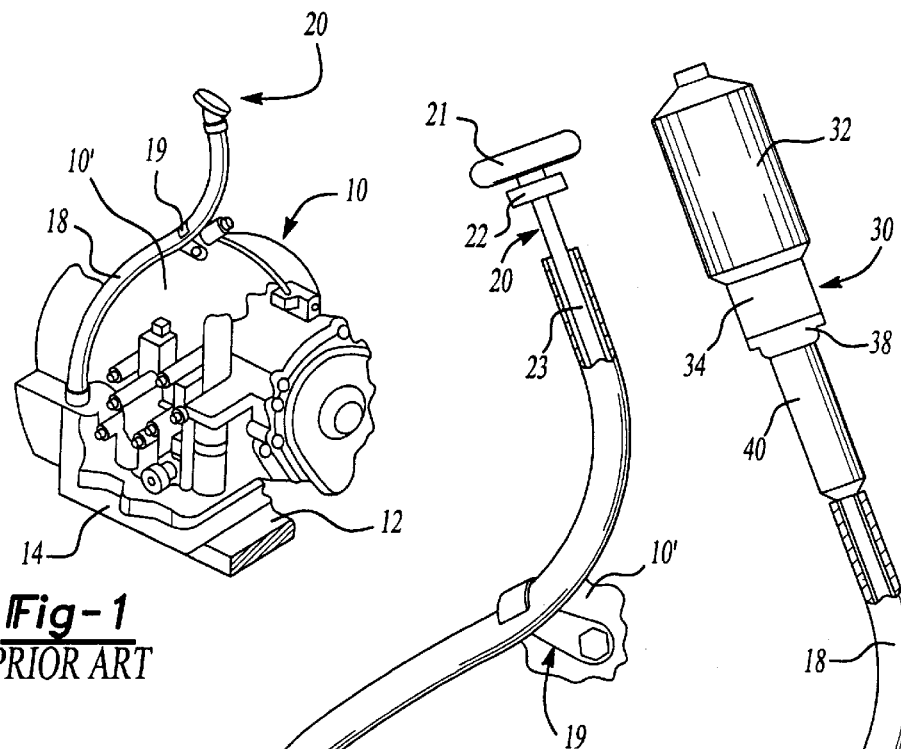
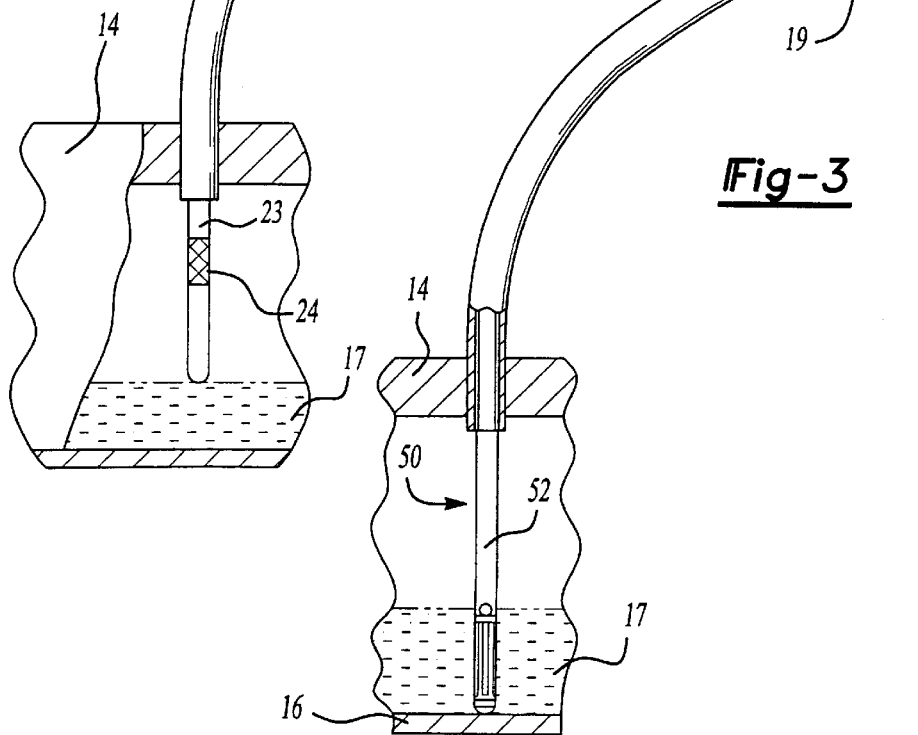
Fig-1 PRIOR ART
Fig-2 PRIOR ART
Fig-3

TEMPERATURE COMPENSATED ASSEMBLY PLANT OIL FILL

BACKGROUND OF THE INVENTION

1. Field of the Invention

The present invention relates generally to a method of supplying operating fluid to an automatic transmission, and more particularly to a temperature compensated method of supplying operating fluid to an automatic transmission.

BACKGROUND AND SUMMARY OF THE INVENTION

During the manufacture of an automobile having an automatic transmission, the operating fluid must be supplied to the automatic transmission. Prior to the present invention, various fluid filling devices and methods have been devised to fill transmissions and the like with an operating fluid. In U.S. Pat. No. 5, 860,459 for Apparatus and Method of Filling An Automatic Transmission With Working Fluid, issued Jan. 19, 1999 to Reed et al and assigned to the Assignee of the present application, an improved fluid fill control wand assembly is disclosed which supplies fluid and alternately removes fluid for establishing a desired fluid level in the automatic transmission.

While prior art devices are known for establishing a desired fluid level in an automatic transmission, they do not disclose or suggest a temperature compensated method of supplying operating fluid to an automatic transmission. The density of hydraulic fluid used in an automatic transmission changes with temperature. Accordingly, if hydraulic fluid which is initially supplied to an automatic transmission is allowed to warm up or cool down prior to a final transmission fill stage, the volume of hydraulic fluid in the transmission will vary causing potential overfill or underfill of the transmission depending upon the transmission fluid temperature. Previous temperature filling methods have assumed that the transmission fluid is maintained within a specified temperature range approximately equaling the assembly plant temperature. Based upon this assumption, the oil fill level is assumed to be within a specified range and the transmission is filled to this assumed level. However, the assumptions that have been relied upon, if incorrect, may lead to underfill or overfill problems which also lead to manufacturer warranty problems.

Accordingly, the present invention provides a temperature compensated method of assembly plant transmission fluid supply. In particular, a method of filling a transmission with oil is provided including the steps of providing an initial amount of oil in the transmission, sensing the temperature of oil in the transmission, determining a desired oil level based upon the temperature of oil in the transmission, measuring a second amount of oil corresponding to the desired level, and adding the second amount of oil to the transmission. The step of sensing the temperature of oil in the transmission includes communicating with existing electronics of a vehicle to obtain a transmission oil temperature as sensed by a vehicle transmission oil temperature sensor. The system of the present invention allows for a much larger temperature range to be accommodated for during the transmission oil fill stage of the vehicle final assembly.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is a pictorial view of a portion of an automatic transmission for a vehicle with a conventional fill tube and dipstick leading into the transmission oil sump;

FIG. 2 is an enlarged pictorial view of the fill tube and a dipstick assembly partially inserted into the fill tube and sump with portions broken away;

FIG. 3 is a pictorial view similar to FIG. 2, but with the dipstick removed from the fill tube and replaced by a fluid fill wand as used according to the principles of the present invention;

DETAILED DESCRIPTION OF THE PREFERRED EMBODIMENTS

Figure 4:
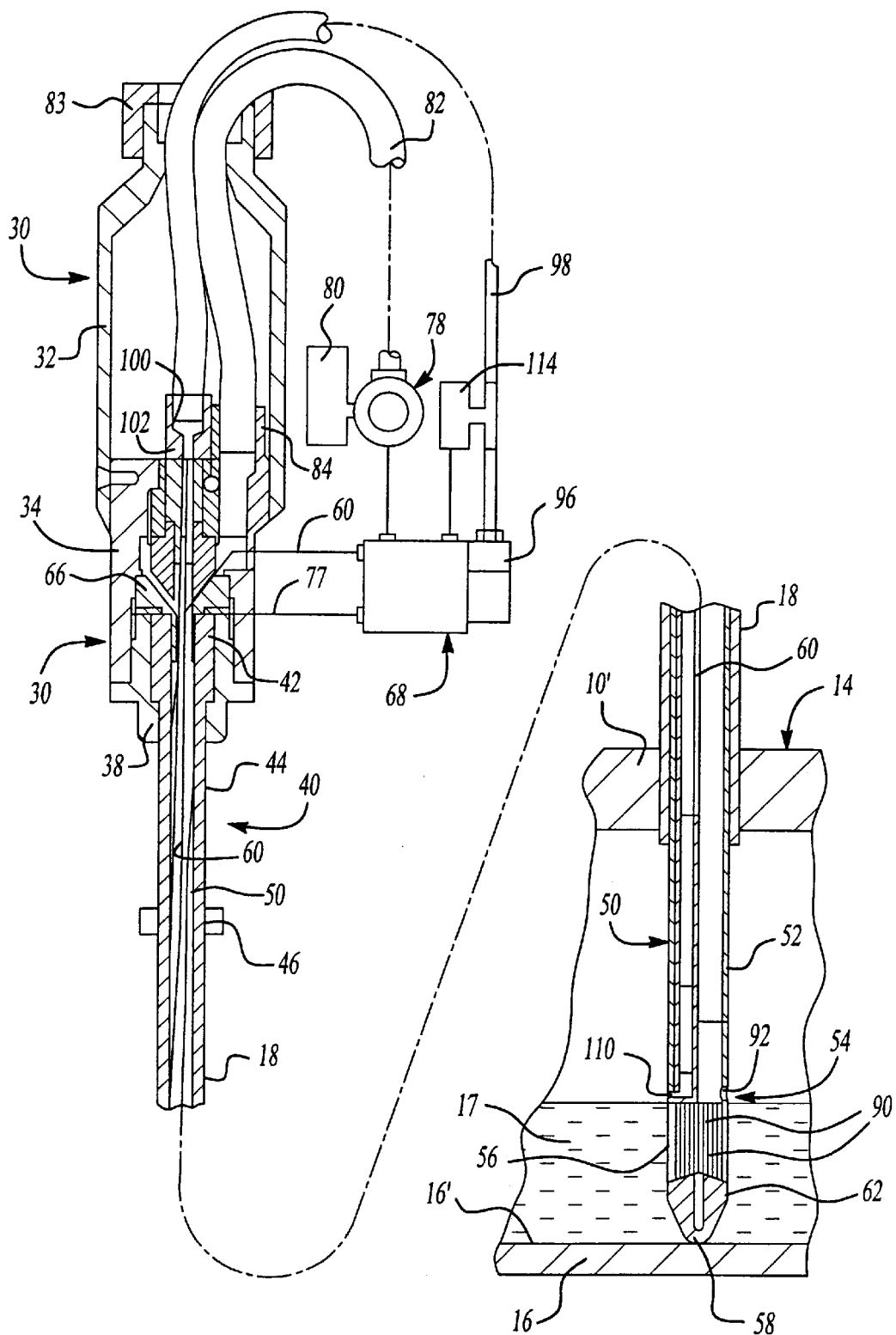
FIG. 4 is an enlarged cross-sectional view of the fluid fill wand and fill tube of FIG. 3 with an associated fluid fill pump and controls shown diagrammatically.
Figure 5:
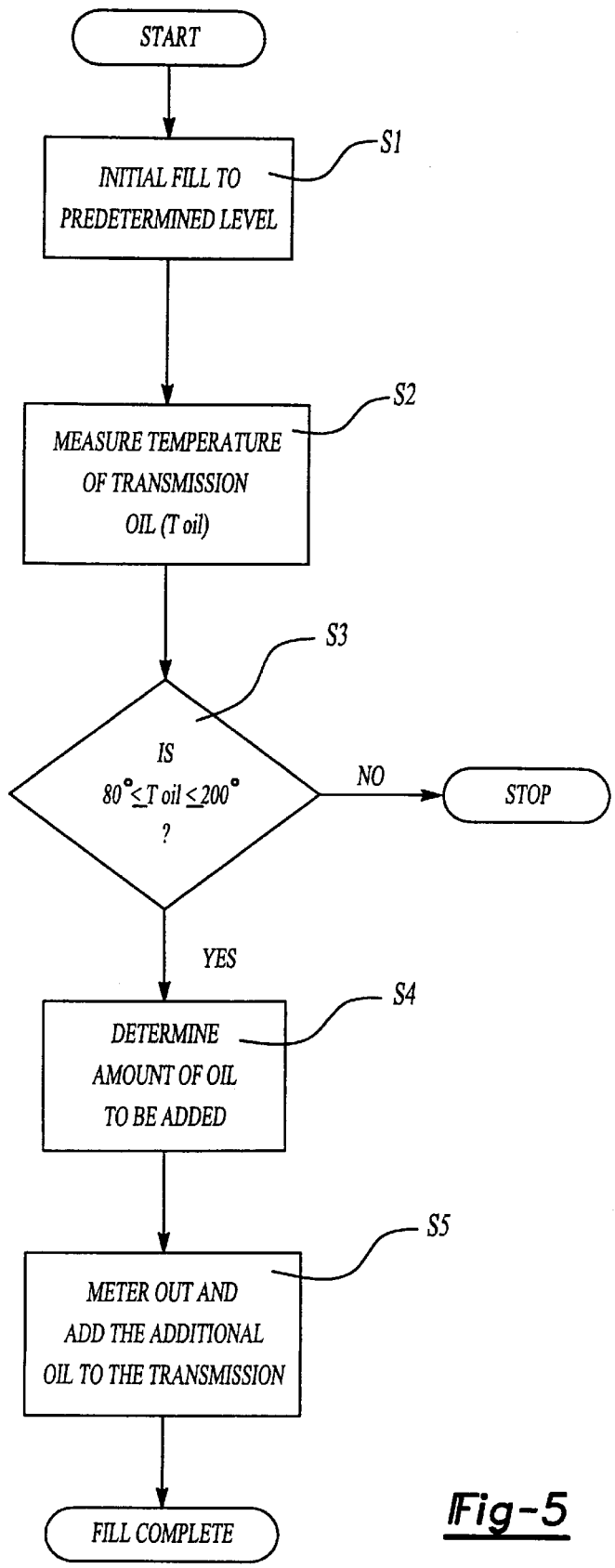
FIG. 5 is a flowchart illustrating oil fill method according to the principles of the present invention.

FIG. 1 shows a portion of a hydrodynamic automatic transmission 10 mounted to a support structure 12 of a vehicle such as a truck. The transmission 10 includes a torque converter assembly (not visible). The housing 10' of transmission 10 defines a fluid sump portion 14 which is closed at the lower portion by a conventional metallic pan 16 as is seen in FIGS. 3 and 4. The sump portion 14, including pan 16, provides a reservoir for transmission operating fluid, i.e., oil needed for operation of the torque converter and transmission to affect vehicle movement and changes in transmission gear ratio.

Hydrodynamic transmissions typically have elongated metal fill tubes 18 which are connected at a lower end portion through a wall of the transmission sump 14. The fill tube 18 usually must take a circuitous and curved route upward from the sump 14 to an open upper end portion. The open upper end portion is supported by attachment to the transmission housing 10' by bracket end fastener assembly 19. With this arrangement, the fill tube 18 provides a passage or tube for the entry or exit of fluid in the transmission's sump portion. The upper opening of the fill tube 18 is conveniently located in a vehicle engine compartment so that transmission fluid can be readily added to the transmission as required.

As shown in FIG. 2, the fill tube 18 normally supports an elongated dipstick assembly 20 inserted therethrough. The dipstick assembly 20 has a handle portion 21 and a fill tube closure cap portion 22 attached to the upper end. The assembly 20 also has an elongated flexible blade portion 23 which is insertably extended into and through the fill tube 18 where its lower end extends into the transmission sump 14. As is known, the dipstick assembly 20 can be removed from its installed position in fill tube 18 for checking the fluid level of transmission oil 17 in the sump 14. Fluid clinging to the blade portion 23 as related to conventional markings 24 on the blade indicate the liquid level in the sump 14 so that transmission oil can be added as necessary.

During vehicle assembly, the vehicle chassis moves along an assembly line for installation of an engine and transmission. The transmission is provided with a small, inconsistent amount of working fluid prior to installation. Subsequently, the transmission is filled with operating fluid to a desired level. The present invention is directed to a new and improved fluid fill top off method to improve assembly efficiency and provide a more optimized fluid level for each transmission. The system measures the temperature of an initial amount of transmission fluid added to the transmission and compensates for the temperature when providing the final top off supply of transmission fluid.

A preferred embodiment of the filling instrument is illustrated in FIGS. 3–6 which is described in detail in U.S. Pat. No. 5,860,459 assigned to the Assignee of the present application and herein incorporated by reference. The fill wand assembly 30 includes an upper portion including a cylindrical hood member 32 which is sized and configured for being manually gripped to allow ready insertion into a fill tube 18. From the hood portion 32, a generally cylindrical body member 34 extends. Specifically, body member 34 is fastened to, and extends axially from, a lower end portion of the hood member 32. A retainer cap 38 is attached to a lower portion of the body member 34 by a threaded connection or some other suitable security means.

The retainer cap 38 secures an elongated and tubular positioning and sensor member 40 to body member 34. The positioning and sensor member 40 has an enlarged cylindrical head portion 42 held to body member 34 by the retainer cap 38. An elongated and tubular shank portion 44 of member 40 extends through an annular opening defined in the retainer cap member 38 and has a tapered distal end portion 46 which is adapted to engage the upper end opening in the fill tube 18 after the assembly 30 is insertably positioned within the fill tube 18. An upper end portion of a flexible tube 50 for transmitting oil is secured within the tubular sensor member 40. The oil passage tube 50 extends out from the sensor tube 40 and terminates with a remote distal end portion 52 as is best seen in FIG. 4. The end portion is attached to an outlet tip assembly 54. The outlet tip assembly 54 is insertably and frictionally attached to the lower end portion 52 of the oil passage tube 50. Tip assembly 54 is configured so as to allow ready insertion into the oil fill tube 18 and includes a generally cylindrical body portion 56 of nylon or other suitable elastomeric material and an end contact 58 of titanium or other suitable electrically conductive material.

The contact tip 58 of the tip assembly 54 has a neck portion that is insertably and frictionally engaged with a corresponding lower end portion of the body 56. The contact tip 58 is adapted to physically engage the inner surface 16' of the pan wall 16 so that an electrical circuit can be completed therebetween as shown in FIGS. 3 and 4. The closing of the circuit in association with other components to be described hereafter initiates operation of a control assembly and an associated transmission fluid pump to automatically add fluid to or subtract fluid from the transmission sump.

In association with a contact tip 58, the aforementioned circuit includes an elongated wire or conductor 60 leading from its connection with the contact tip 58 which is established by a set screw 62. The conductor wire 60 is routed from the contact tip 58 through the flexible oil transmitting tube 50 then through insert member 66 which is mounted within the body member 34. As shown somewhat diagrammatically in FIG. 4, wire 60 then extends through the side of the body member in a sealing manner to a control assembly 68. As previously stated, circuit components other than the contact tip 58 and wire 60, are involved for activation of the control assembly 68. Specifically, as shown in FIG. 4, the previously mentioned engagement of the distal end portion 46 of the fill tube sensor member 40 with the upper end portion of the metallic fill tube 18 complete a circuit with the control assembly by means of wire conductor 77. The electrically conductive metal fill tube 18 and the metal transmission housing including wall 16 complete the circuit. The wire conductor 77 is operatively and electrically connected to sensor member 40.

Upon closing of the above-described circuit, the control assembly 68 initiates operation of an electrically powered reversible fluid pump 78 which pumps transmission fluid from a reservoir 80 into the transmission sump 14 when in a first mode of operation and, alternately, which pumps fluid from the sump 14 back into the reservoir 80 when in a second mode of operation. As shown in FIG. 4, an elongated flexible hose 82 is routed from the outlet of the pump 78 through fittings 83, 84 associated with members 32 and 34, respectively. The transmission fluid flows through hose 82 and then is routed through passages 86 formed in the insert member 66. The fluid then flows through tube 50 to the fluid dispensing body 56 of the contact tip assembly 54.

As best shown in FIG. 4, the dispensing tip body 56 is a generally cylindrical member that has a plurality of equally spaced and elongated fluid flow slots formed therein. This circumferential arrangement of slots promotes an orderly flow of transmission fluid to a sump with minimized turbulence and frothing. In addition to slots 90, a radial or transverse fluid flow port 92 is provided in the tip body adjacent to the end of the oil transmitting tube 50 for increasing the capacity of oil flow into and out of the sump.

An air pump 96 is provided in addition to the fluid pump 78. The air pump 96 has an associated pressure regulating valve assembly operated with the control assembly 68 to provide a source of pressurized air that is fed through a flexible air feed line or hose 98 to an entrance 100 of an air inlet port post 102 within member 34 as best shown in FIG. 4. The air tube port post 102 is mounted within an insulative bushing within member 34. The air tube post 102 encases a cylindrical and centralized air tube fitting. This fitting has a threaded and axially extending neck which threads into the insert member 66.

An elongated air tube made of a suitable elastomeric material extends from the entrance 100 of the port post 102 through a central passage in the air tube fitting, through insert member 66 and then through the oil transmitting tube 50. The air tube terminates at a connection with a tubular pipe that itself fits into the top portion of the wand tip body 56 of assembly 54. The pipe member opens into a sensing port 110 which extends radially in the wand tip body 56 and is spaced a predetermined distance from the end most extremity of the contact tip 58. This spatial relationship establishes the desired height or depth of transmission oil within the sump.

With the aforedescribed construction, the air pump 96 is operatively connected with the sensing port 110 to cause a flow of air at a regulated pressure to be supplied through port 110. The control assembly 68 includes a pressure sensor device 114 connected in the tube 98 to sense changes and pressure at sensing port 110 relative to the regulated pressure so that the control assembly 68 directs an appropriate operation of the reversible pump 78 to either add or remove transmission fluid from the sump in accordance with the desirable fluid level therein.

In operation, when the fill wand assembly 30 is inserted into a transmission fill tube 18 and is activated, the sensing member 40 engages the top of the fill tube at about the time the contact tip 58 engages the bottom 16' of the pan 16. The engagement of the distal end portion 46 of the fill tube sensor 40 with the top of the fill tube 18 completes a circuit to the control assembly 68. The tip 58 and wire 60 completes a circuit to the control assembly 68. Resultantly, the controls receive signals from the pressure sensor to effect operation of the air pump and of the fluid fill pump 78 for a fluid filling operation. If the sensor 114 senses that there is increased pressure at the sensing port 110, the pump is operated to remove fluid from the sump 14 through tip assembly 54. The fluid flows through the hose 52 back to the reservoir 80 if the sensor 114 senses a relatively low pressure, the control assembly operates the pump in a manner to pass fluid from the reservoir 80 into the sump 14 until the level reaches the sensing port at which time the sensor 114 terminates the filling operation. Subsequently, the wand assembly is removed from the fill tube 18 which breaks the circuit continuity. Accordingly, the appropriate amount of fluid is supplied to the pump with the bottom of the pan providing a fixed datum plane for the fluid level sensed by the sensing port.

Figure 6:
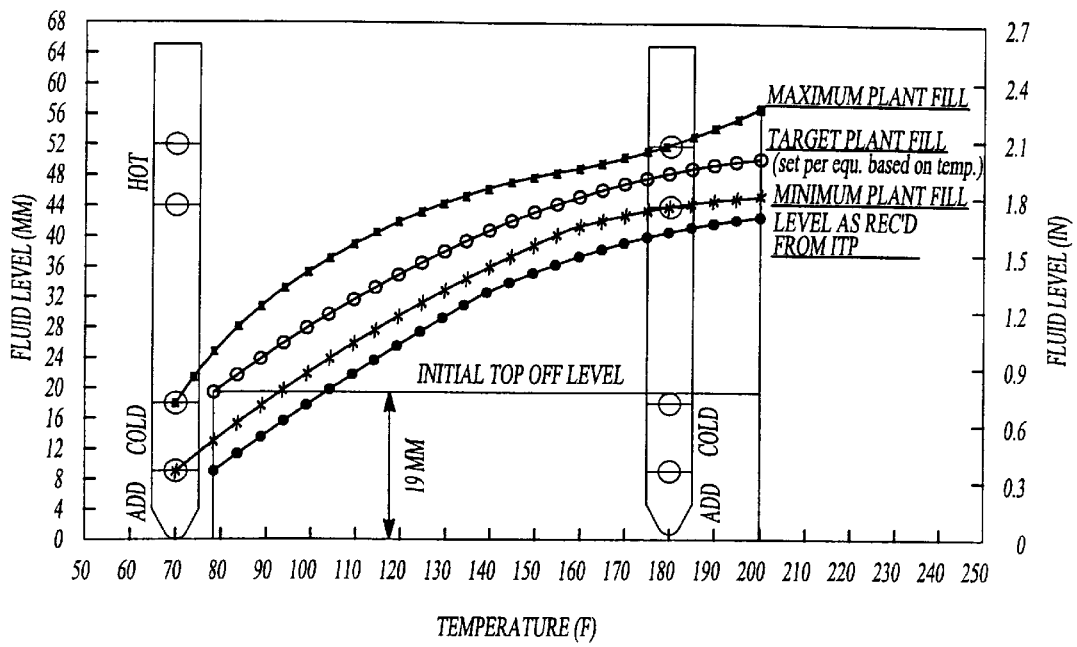
FIG. 6 is a graphical illustration of the target oil fill level versus various temperatures.
Figure 7:
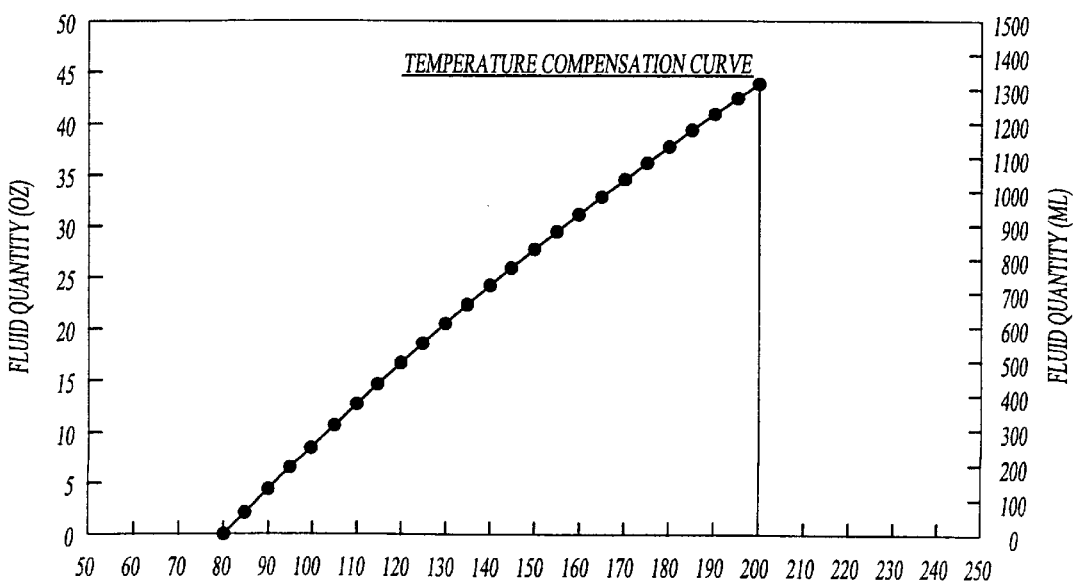
FIG. 7 is a graphical illustration of the fluid quantity to be added to the transmission based upon the sensed transmission oil temperature.

According to the temperature compensated filling method of the present invention, the transmission is provided with an initial amount of transmission fluid as shown in step S1 in FIG. 6. Specifically, the above described wand assembly 30 is utilized to fill the transmission sump 14 to a predetermined level. For example, as shown in FIG. 6, an initial fill level of 19 mm is utilized in the illustrated example. The 19 mm level represents the target fill level at the lowest temperature, 80° F., that the system will allow the transmission fill to commence. The upper temperature limit is set at, for example, 200° F. A computer is connected to the vehicle's electronics to determine the vehicle transmission fluid temperature by plugging into the vehicle body controller in the passenger compartment of the vehicle so that the temperature can be read from the existing transmission fluid temperature sensor at step S2. It is determined at step S3 if the transmission oil temperature is greater than 80° F. and less than 200° F. If not, the oil fill process is stopped. If the oil temperature is within the predetermined range, control proceeds to step S4. From the sensed transmission fluid temperature value, the computer determines a desired fluid quantity to be added to the transmission (step S4) based upon the characteristic chart shown in FIG. 7. The chart shown in FIG. 7 is derived from the desired fluid levels for the 80–200° F. temperature range. The computer then provides instructions to a metering device to meter out the desired amount of oil at step S5. This metered amount of oil is then added to the transmission, and upon completion, the wand is removed from the fill tube and the dipstick is inserted therein.

With the method of the present invention, the temperature of the oil being added to the transmission is maintained at a constant temperature (for example 96° F.) so that its density is known. During initial fill of the transmission, the step of filling the transmission to the initial level is performed using the fill wand as shown in FIGS. 1–4. As the fill wand senses that the oil level has reached the initial fill level, for example, nineteen millimeters, the initial fill automatically shuts off fluid supply. During the top off fill, since the fluid quantity to be added is a direct function of the oil transmission oil temperature, the precise amount of fluid at a predetermined temperature can be metered out and supplied to the transmission.

The graphical characterization (FIG. 7) of the desired fluid level as a function of the transmission oil temperature is experimentally determined with respect to the specific transmission type. This characterization curve can be represented by a mathematical equation or a look up table and used by the controller to determine the appropriate amount of oil to be added during the top off fill stage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of filling a transmission with oil, comprising the steps of:

providing an initial amount of oil in the transmission;

sensing the temperature of oil in the transmission;

determining a desired oil level based upon the temperature of oil in the transmission;

measuring a second amount of oil corresponding to the desired level; and adding the second amount of oil to the transmission.

2. The method according to claim 1, wherein said step of sensing the temperature of oil in the transmission includes communicating with existing electronics of a vehicle to obtain a transmission oil temperature as sensed by a vehicle transmission oil temperature sensor.

3. The method according to claim 1, further comprising the step of determining if the transmission oil temperature is within a predetermined range and, if not, halting the oil fill sequence and allowing the transmission oil to warm or cool as necessary in order to fall within the predetermined range.

* * * * *